(12) United States Patent
Kapczynski et al.

(10) Patent No.: US 8,484,186 B1
(45) Date of Patent: Jul. 9, 2013

(54) PERSONALIZED PEOPLE FINDER

(75) Inventors: Mark Joseph Kapczynski, Santa Monica, CA (US); Michael John Dean, Torrance, CA (US)

(73) Assignee: ConsumerInfo.com, Inc., Irvine, CA (US)

( * ) Notice: Subject to any disclaimer, the term of this patent is extended or adjusted under 35 U.S.C. 154(b) by 12 days.

(21) Appl. No.: 13/235,049

(22) Filed: Sep. 16, 2011

Related U.S. Application Data

(60) Provisional application No. 61/413,294, filed on Nov. 12, 2010.

(51) Int. Cl.
*G06F 17/30* (2006.01)

(52) U.S. Cl.
USPC ........... 707/706; 707/703; 707/722; 707/736; 707/758; 707/609

(58) Field of Classification Search
USPC .................................................. 707/600–899
See application file for complete search history.

(56) References Cited

U.S. PATENT DOCUMENTS

| | | | |
|---|---|---|---|
| 5,659,731 | A | 8/1997 | Gustafson |
| 5,933,827 | A | 8/1999 | Cole et al. |
| 6,018,619 | A | 1/2000 | Allard et al. |
| 6,072,894 | A | 6/2000 | Payne |
| 6,073,140 | A | 6/2000 | Morgan et al. |
| 6,128,624 | A | 10/2000 | Papierniak et al. |
| 6,151,584 | A | 11/2000 | Papierniak et al. |
| 6,151,601 | A | 11/2000 | Papierniak et al. |
| 6,182,068 | B1 | 1/2001 | Culliss |
| 6,397,212 | B1 | 5/2002 | Biffar |
| 6,539,377 | B1 | 3/2003 | Culliss |
| 6,546,393 | B1 | 4/2003 | Khan |
| 6,553,367 | B2 | 4/2003 | Horovitz et al. |
| 6,623,529 | B1 | 9/2003 | Lakritz |
| 6,631,496 | B1 | 10/2003 | Li et al. |
| 6,654,813 | B1 | 11/2003 | Black et al. |
| 6,792,458 | B1 | 9/2004 | Muret et al. |
| 6,804,701 | B2 | 10/2004 | Muret et al. |
| 6,810,356 | B1 | 10/2004 | Garcia-Franco et al. |

(Continued)

FOREIGN PATENT DOCUMENTS

| | | |
|---|---|---|
| EP | 0 981 097 | 2/2000 |
| EP | 1239378 (A2) | 1/2002 |

(Continued)

OTHER PUBLICATIONS

U.S. Appl. No. 12/705,489, Feb. 12, 2010, Bargoli et al.

(Continued)

*Primary Examiner* — Isaac M Woo
(74) *Attorney, Agent, or Firm* — Knobbe, Martens, Olson & Bear LLP

(57) ABSTRACT

Methods and systems are provided for determining a person that matches a user request. A user request may be received that includes identification information at least partially identifying a person other than the requesting user, the request including a name of the person. Personal information regarding the requesting user and validated personal information regarding individuals potentially matching the request may be retrieved. A score may then be determined for each potentially matching individual, where the score is determined by comparing the personal information regarding the requesting user and the validated personal information regarding the given individual. A matching individual may then be determined based on the determined scores.

18 Claims, 10 Drawing Sheets

U.S. PATENT DOCUMENTS

| | | | |
|---|---|---|---|
| 6,816,850 B2 | 11/2004 | Culliss | |
| 6,983,379 B1 | 1/2006 | Spalink et al. | |
| 7,003,792 B1 | 2/2006 | Yuen | |
| 7,020,082 B2 | 3/2006 | Bhagavath et al. | |
| 7,194,416 B1 | 3/2007 | Provost et al. | |
| 7,356,516 B2 | 4/2008 | Richey et al. | |
| 7,360,251 B2 | 4/2008 | Spalink et al. | |
| 7,370,044 B2 | 5/2008 | Mulhern et al. | |
| 7,433,864 B2 | 10/2008 | Malik | |
| 7,577,665 B2 | 8/2009 | Ramer et al. | |
| 7,647,344 B2 | 1/2010 | Skurtovich, Jr. et al. | |
| 7,653,592 B1 | 1/2010 | Flaxman et al. | |
| 7,657,520 B2 | 2/2010 | Chen et al. | |
| 7,792,715 B1 | 9/2010 | Kasower | |
| 7,970,679 B2 | 6/2011 | Kasower | |
| 8,037,097 B2 | 10/2011 | Guo et al. | |
| 8,195,549 B2 | 6/2012 | Kasower | |
| 8,244,848 B1 * | 8/2012 | Narayanan et al. | 709/223 |
| 8,285,656 B1 | 10/2012 | Chang et al. | |
| 2002/0045154 A1 | 4/2002 | Wood et al. | |
| 2002/0059201 A1 | 5/2002 | Work | |
| 2002/0103809 A1 | 8/2002 | Starzl et al. | |
| 2002/0116354 A1 | 8/2002 | Baudu et al. | |
| 2003/0115133 A1 | 6/2003 | Bian | |
| 2003/0187837 A1 | 10/2003 | Culliss | |
| 2003/0195859 A1 | 10/2003 | Lawrence | |
| 2003/0220858 A1 | 11/2003 | Lam et al. | |
| 2004/0015714 A1 | 1/2004 | Abraham et al. | |
| 2004/0015715 A1 | 1/2004 | Brown | |
| 2004/0019518 A1 | 1/2004 | Abraham et al. | |
| 2004/0030649 A1 | 2/2004 | Nelson et al. | |
| 2004/0122681 A1 | 6/2004 | Ruvolo et al. | |
| 2004/0167793 A1 | 8/2004 | Masuoka et al. | |
| 2004/0210661 A1 | 10/2004 | Thompson | |
| 2004/0230527 A1 | 11/2004 | Hansen et al. | |
| 2004/0249811 A1 | 12/2004 | Shostack | |
| 2005/0021551 A1 | 1/2005 | Silva et al. | |
| 2005/0027983 A1 | 2/2005 | Klawon | |
| 2005/0055296 A1 | 3/2005 | Hattersley et al. | |
| 2005/0058262 A1 | 3/2005 | Timmins et al. | |
| 2005/0071328 A1 | 3/2005 | Lawrence | |
| 2005/0154665 A1 | 7/2005 | Kerr | |
| 2005/0216434 A1 | 9/2005 | Haveliwala et al. | |
| 2005/0288998 A1 | 12/2005 | Verma et al. | |
| 2006/0004623 A1 | 1/2006 | Jasti | |
| 2006/0041464 A1 | 2/2006 | Powers et al. | |
| 2006/0059110 A1 | 3/2006 | Madhok et al. | |
| 2006/0074986 A1 | 4/2006 | Mallalieu et al. | |
| 2006/0129533 A1 | 6/2006 | Purvis | |
| 2006/0161435 A1 | 7/2006 | Atef et al. | |
| 2006/0218407 A1 | 9/2006 | Toms | |
| 2006/0229961 A1 | 10/2006 | Lyftogt et al. | |
| 2006/0253358 A1 | 11/2006 | Delgrosso et al. | |
| 2006/0271457 A1 | 11/2006 | Romain et al. | |
| 2007/0032240 A1 | 2/2007 | Finnegan et al. | |
| 2007/0061243 A1 | 3/2007 | Ramer et al. | |
| 2007/0112667 A1 | 5/2007 | Rucker | |
| 2007/0245245 A1 | 10/2007 | Blue et al. | |
| 2008/0028067 A1 | 1/2008 | Berkhin et al. | |
| 2008/0052182 A1 | 2/2008 | Marshall | |
| 2008/0052244 A1 | 2/2008 | Tsuei et al. | |
| 2008/0086431 A1 | 4/2008 | Robinson et al. | |
| 2008/0109422 A1 | 5/2008 | Dedhia | |
| 2008/0109875 A1 | 5/2008 | Kraft | |
| 2008/0162383 A1 | 7/2008 | Kraft | |
| 2008/0183585 A1 | 7/2008 | Vianello | |
| 2009/0063451 A1 | 3/2009 | Bennett | |
| 2009/0100047 A1 | 4/2009 | Jones et al. | |
| 2009/0106846 A1 | 4/2009 | Dupray et al. | |
| 2009/0126013 A1 | 5/2009 | Atwood et al. | |
| 2009/0157693 A1 | 6/2009 | Palahnuk | |
| 2009/0204599 A1 | 8/2009 | Morris et al. | |
| 2009/0327270 A1 | 12/2009 | Teevan et al. | |
| 2010/0063993 A1 | 3/2010 | Higgins et al. | |
| 2010/0114747 A1 | 5/2010 | Kasower | |
| 2010/0136956 A1 | 6/2010 | Drachev et al. | |
| 2010/0153290 A1 | 6/2010 | Duggan | |
| 2010/0161816 A1 | 6/2010 | Kraft et al. | |
| 2010/0223192 A1 | 9/2010 | Levine et al. | |
| 2010/0262932 A1 | 10/2010 | Pan | |
| 2010/0281020 A1 | 11/2010 | Drubner | |
| 2012/0110677 A1 | 5/2012 | Abendroth et al. | |

FOREIGN PATENT DOCUMENTS

| | | |
|---|---|---|
| EP | 1301887 A1 | 4/2003 |
| GB | 2 346 229 | 8/2000 |
| JP | 2005208945 (A) | 8/2005 |
| KR | 20000063313 (A) | 11/2000 |
| KR | 20020039203 (A) | 5/2002 |
| KR | 20070081504 (A) | 8/2007 |
| WO | WO 00/46696 | 8/2000 |
| WO | WO 00/57611 | 9/2000 |
| WO | WO 01/025896 | 4/2001 |
| WO | WO 02/29636 | 4/2002 |
| WO | WO0229636 | 4/2002 |
| WO | WO 03/025695 | 3/2003 |
| WO | WO 2005/033979 | 4/2005 |
| WO | WO2009064694 | 5/2009 |
| WO | WO2009102391 | 8/2009 |
| WO | WO 2010001406 | 1/2010 |
| WO | WO 2010077989 | 7/2010 |

OTHER PUBLICATIONS

U.S. Appl. No. 12/705,511, Feb. 12, 2010, Bargoli et al.
Rupp et al., "INDEX: A Platform for Determining how People Value the Quality of their Internet Access", May 1998, http://www.INDEX.Berkeley.EDU/reports/98-010P in 7 pages.
BlueCava, "What We Do", http://www.bluecava.com/what-we-do/, printed Nov. 5, 2012 in 3 pages.
Chores & Allowances. "Do Kids Have Credit Reports?", Oct. 15, 2007, http://choresandallowances.blogspot.com/2007/10/do-kids-have-credit-reports.html.
Gibbs, Adrienne; "Protecting Your Children from Identity Theft," Nov. 25, 2008, http://www.creditcards.com/credit-card-news/identity-ID-theft-and-kids-children-1282.php, in 4 Pages.
ID Theft Assist, "Do You Know Where Your Child's Credit Is?", Nov. 26, 2007, http://www.idtheftassist.corn/pages/story14.
Iovation, Device Identification & Device Fingerprinting, http://www.iovation.com/risk-management/device-identification printed Nov. 5, 2012 in 6 pages.
Li et al., "Automatic Verbal Information Verification for User Authentication", IEEE Transactions on Speech and Audio Processing, vol. 8, No. 5, Sep. 2000, pp. 585-596.
LifeLock; "How Can LifeLock Protect My Kids and Family?" http://www.lifelock.corn/lifelock-for-people/how-we-do-it/how-can-lifelock-protect-my-kids-and-family printed Mar. 14, 2008 in 1 page.
Ogg, Erica, "Apple Cracks Down on UDID Use", http://gigaom.com/apple/apple-cracks-down-on-udid-use/ printed Nov. 5, 2012 in 5 Pages.
Vamosi, Robert, "How to Handle ID Fraud's Youngest Victims," Nov. 21, 2008, http://news.cnet.com/8301-10789_3-10105303-57.html.
People Search & Directory Services Powered by Intelius http://www.intelius.com/people-search.html?=&gclid=CJqZIZP7paUCFYK5KgodbCUJJQ printed Nov. 16, 2010.
"The Leading Premium People Search Site on the Web" http://www.peoplesearch.com/ printed Nov. 16, 2010.
Yahoo People Search—http://people.yahoo.com/ printed Nov. 16, 2010.
"Find People and Related Records" http://www.peoplefmders.com/?CMP=Google&utm_source=google&utm_medium=cpc printed.
PeopleLookup People Search—Piblic Records, Background Checks & More http://www.peoplelookup.com/people-search.html?matchtype=Exact&gclid=CLyd5tT7pa printed Nov. 16, 2010.
Facebook helps you connect and share with the people in your life http://www.facebook.com/ printed Nov. 16, 2010.
Micarelli, Alessandro, "Personalized Search on the World Wide Web," The Adaptive Web, LNCS 4321, pp. 195-230, 2007.

* cited by examiner

PERSONALIZED PEOPLE FINDER

CROSS REFERENCE TO RELATED APPLICATIONS

This application claims the benefit of U.S. provisional application No. 61/413,294, filed Nov. 12, 2010, the disclosure of which is hereby incorporated by reference in its entirety.

BACKGROUND OF THE DISCLOSURE

1. Field of the Disclosure

Among other things, this disclosure describes systems and methods for determining a person matching a user request based on information associated with the user and information associated with potentially matching persons.

2. Description of the Related Art

Many people maintain an online presence for themselves in a variety of ways, such as maintaining a personal profile on a social networking website, a professional profile in a business directory or network, a personal website or blog, and/or a profile or other account on websites of various types. Given the large numbers of individuals that may share common information, including the same name, city of residence, and/or other basic personal information, it is often difficult to locate a website, profile or other information associated with a specific person that an individual desires to find. For example, existing systems may provide a user with a list of potentially matching persons based on search criteria provided by the user, such as by performing searches of publicly-accessible information to match search criteria provided by the user.

SUMMARY OF THE INVENTION

The present disclosure generally relates to determining a person that matches a user request, and providing information associated with the matching person to the user. In certain embodiments, a user request may be received that includes identification information at least partially identifying a person other than the requesting user. The request could include, for example, a name of a person. Personal information regarding the requesting user and validated personal information regarding individuals potentially matching the request may be retrieved from one or more data sources. A score may then be determined for each potentially matching individual, where the score is determined at least in part by comparing the personal information regarding the requesting user and the validated personal information regarding any located individuals. A matching individual may then be determined based on the determined scores, such as by determining the potentially matching individual with the highest determined score. Information associated with the matching individual may then be provided to the user, such as by sending information associated with the matching individual to the user computing device.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements. In addition, the first digit of each reference number generally indicates the Figure in which the element first appears.

DETAILED DESCRIPTION

Various embodiments of systems, methods, processes, and data structures will now be described with reference to the drawings. Variations to the systems, methods, processes, and data structures which represent other embodiments will also be described.

Example System Architecture

Figure 1:
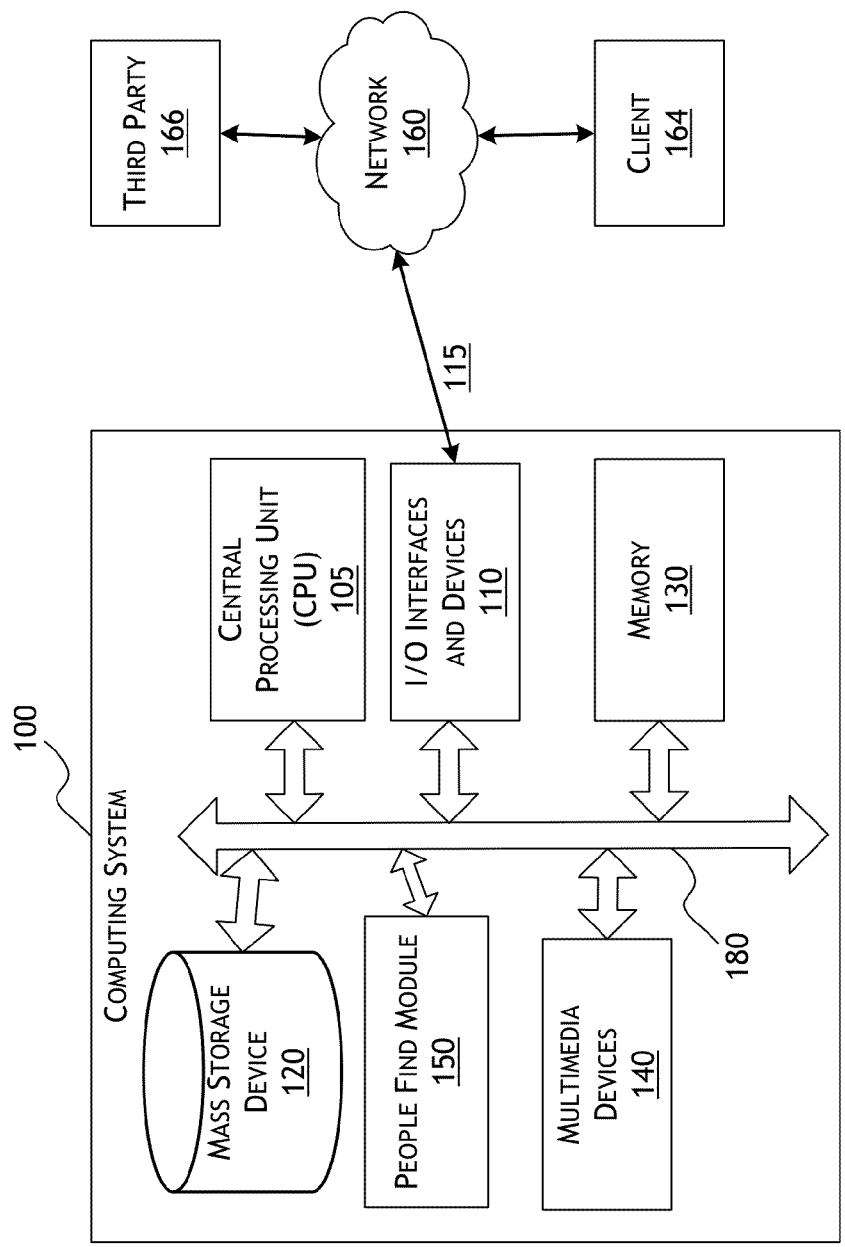
FIG. 1 illustrates one embodiment of a system that finds a matching person based on a search request received from a user and data regarding individuals retrieved from a third party data source.

FIG. 1 is a block diagram showing an embodiment in which a computing system 100 is in communication with a client system 164 and a third party system 166 via a network 160. The computing system 100 may be used to implement systems and methods described herein, including, but not limited to, determining a person that matches a user request. For example, the computing system 100 may include the people find module 150, which implements various embodiments of the present disclosure, including receiving a request partially identifying a person from client system 164, retrieving validated information regarding potentially matching persons from third party system 166, determining a matching person, and sending information regarding the matching person to client system 164.

The computing system 100 includes, for example, a personal computer that is IBM, Macintosh, or Linux/Unix compatible or a server or workstation. In one embodiment, the computing system 100 comprises a server, a laptop computer, a cell phone, a personal digital assistant, a kiosk, or an audio player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 1, information is provided to the computing system 100 over the network 160 from one or more data sources including, for example, the client system 164. The information supplied by the various data sources may include, for example, personal information associated with a number of individuals, including validated data regarding names, addresses, etc. In addition to the devices that are illustrated in FIG. 1, the network 160 may communicate with other data sources or other computing devices. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

A client system 164 may be connected to the network 160 and used by a user to send and receive information to and from the computing system 100. The client system 164 may be a desktop computer, a mobile computer, or any other mobile device such as a mobile phone or other similar handheld computing devices. The client system 164 and/or third party system 166 may include the same or similar components to those discussed above with reference to the computing system 100.

In the embodiment of FIG. 1, the computing system 100 also includes a people find module 150 that may be stored in the mass storage device 120 as executable software codes that are executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 1, the computing system 100 is configured to execute the people find module 150 in order to receive a person find request from client system 164, retrieve validated information regarding one or more potentially matching persons from mass storage device 120 and/or third party system 166, and determine a matching person, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Example User Interfaces

Figure 2A:
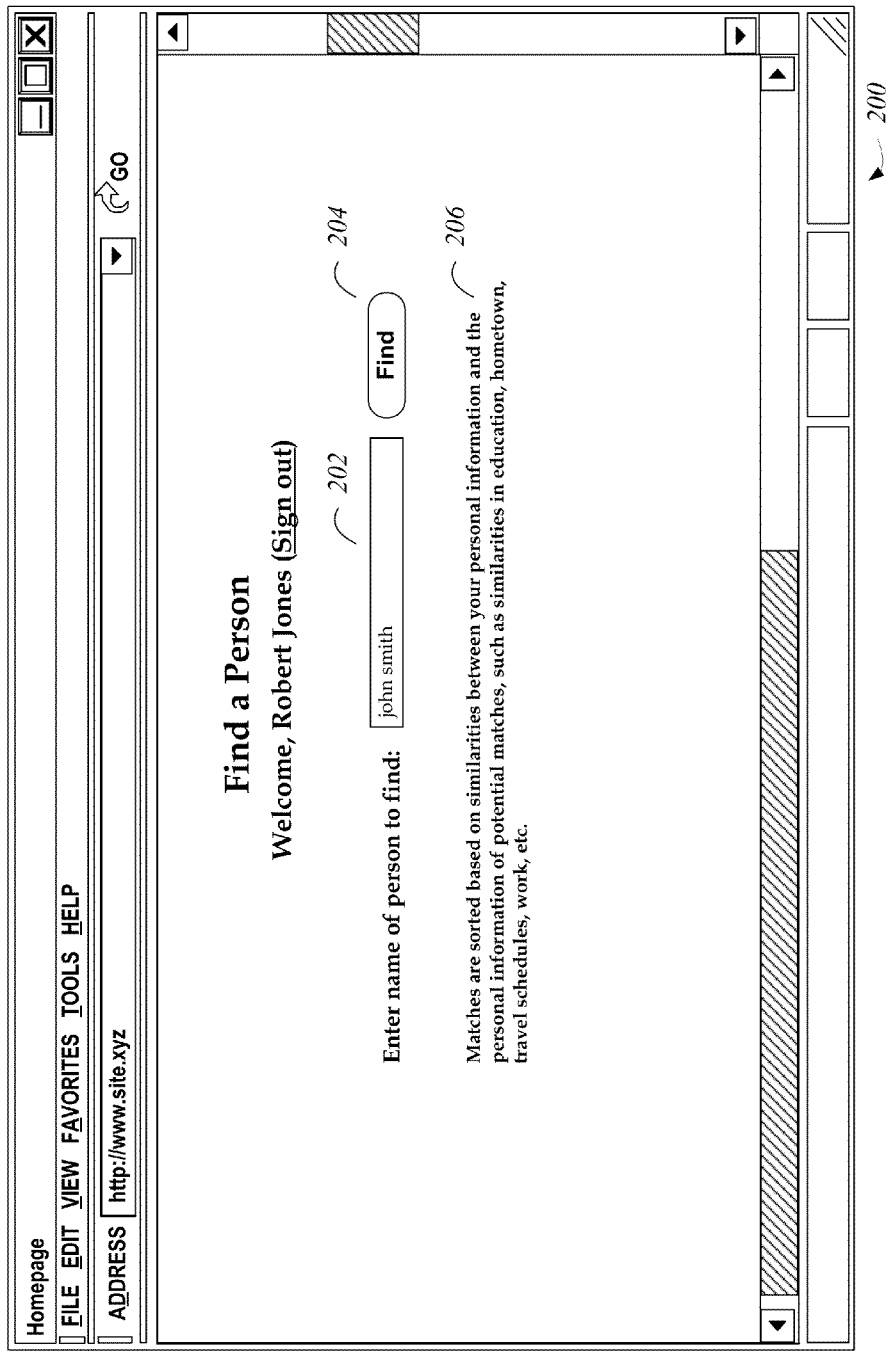
FIGS. 2A-2C are illustrative user interfaces that enable a user to enter a name of a person and request that the people find module described herein determine a matching person.

FIG. 2A is an illustrative user interface 200 generated by the computing system 100 that enables a user to enter a name of a person and request that the people find module 150 determine a matching person. The user interface 200 may be displayed via a browser operating upon a computing device, such as client computing device 164, utilized by a user. User interface 200 may be generated, for example, for a specific user, "Robert Jones," who is associated with a user account maintained by the computing system 100. For example, the user may have previously provided log in information, such as a user name and password, to the computing system 100 in order to identify the user to the computing system 100. Additionally, the user interface may provide access to personal information of the user (either stored on the client computing device 164, by the provider of the find module 150, or at a third party location), such as biographical information that may be used to return matching persons for the particular user, as discussed in further detail below. The user may have requested user interface 200 because the user wishes to locate a specific person, contact a specific person, receive information regarding a specific person, and/or view a page associated with a specific person. The specific person could be, for example, a friend of the user, a business contact of the user, a recent acquaintance of the user, or any other individual in whom the user has some interest.

As illustrated, the user has entered text "john smith" in text field 202, indicating that the specific person that the user is interested in is named John Smith. The user may then select find option 204 in order for the client computing device 164 to send a request to the computing system 100 to find an individual that matches the user's request indicating a specific individual named John Smith. As indicated by text 206, the user is notified that, in the illustrated embodiment, the potentially matching persons will be sorted by the people find module 150 based on similarities between the personal information of the requesting user (Robert Jones) and the personal information of the potentially matching persons, such as similarities in education, hometown, travel schedules, and/or work information. Selection of find option 204 may result in the people find module 150 determining one or more matching persons, then presenting for display on the client computing device 164 a people find results page, such as the user interface described below with reference to FIG. 5.

Figure 2B:
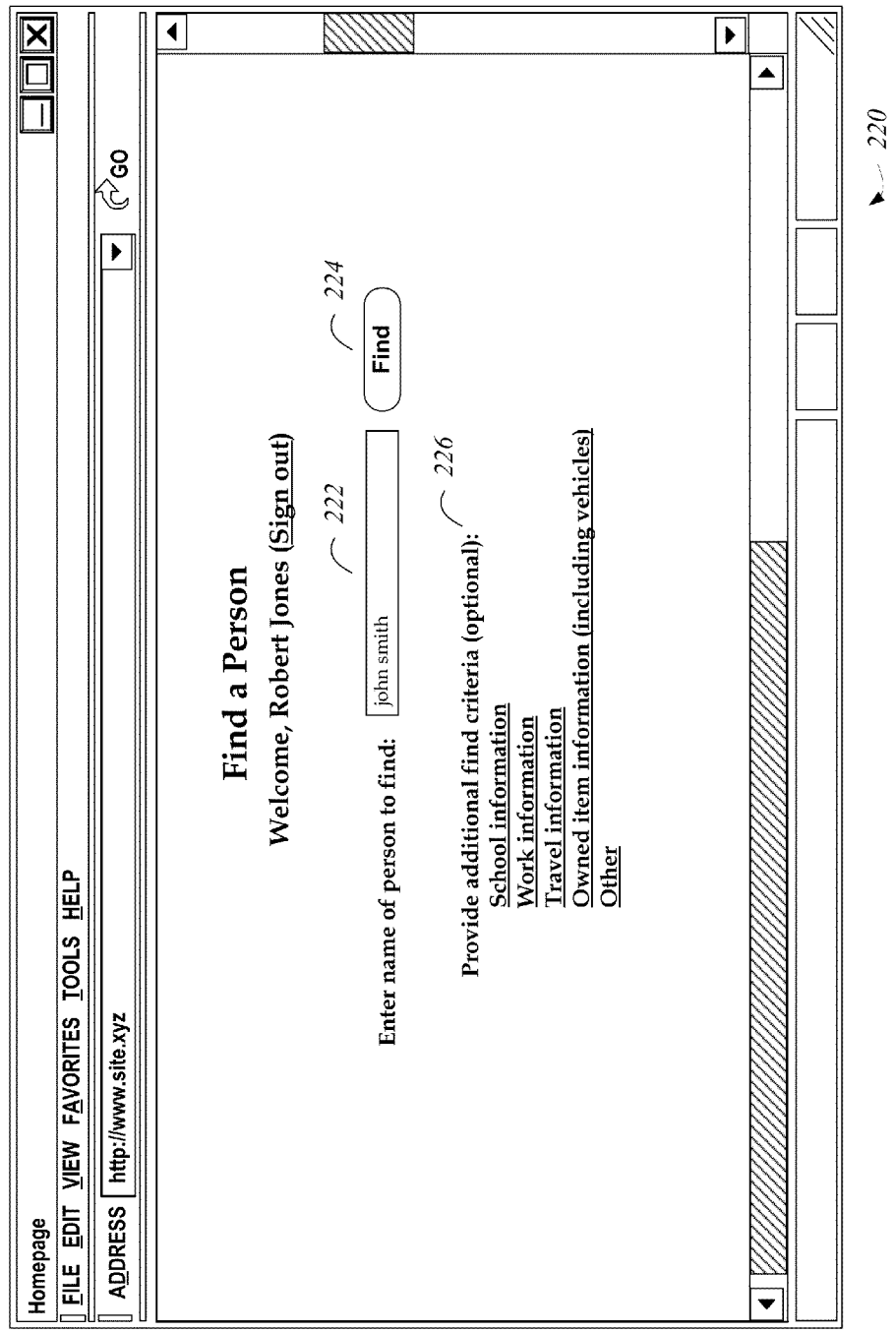

FIG. 2B is an illustrative user interface 220 generated by the computing system 100 that enables a user to enter a name of a person and request that the people find module 150 determine a matching person, including enabling the user to provide additional find criteria other than a name of the person to find. User interface 220 may be sent to client computing device 164 for display to a user that desires to enter more information than may be entered in user interface 200, discussed above with reference to FIG. 2A. User interface 200 includes text field 222, in which the user has entered "john smith" as the name of the person in which the user is interested in receiving information. The user may select find option 224 in order for the client computing device 164 to send a request to the computing system 100 to find an individual that matches the user's request, in a similar manner as described above with respect to FIG. 2A. Alternatively, the user may select to provide one or more additional find criteria using options 226.

The additional find criteria options 226 include school information, work information, travel information, and owned item information. The user may enter school information, for example, to submit to computing device 100 a name of a high school or college that the desired individual (a specific "John Smith," in this case) has attended or is currently attending, or a degree or major associated with the desired individual's academic credentials. For example, the requesting user may desire to find out information regarding someone name John Smith that the requesting user knows attended Stanford University, in which case the user may indicate Stanford University via additional options displayed when the user selects the "School information" option under additional find criteria 226. The school information may be indicated in a variety of ways, such as selected by the user via a selectable menu that includes a list of schools, or entered by the user into a free-form text field similar to text field 222. The user may additionally or alternatively submit to the computing device 100 work information regarding the desired individual. Work information may include, for example, a name of a current or previous employer or company for which the desired individual works or has worked, a general job field or occupation of the desired individual, and/or a job title that the desired individual has held or currently holds.

As another option of additional find criteria 226, the user may submit to the computing device 100 travel information associated with the desired individual (in this case, "John Smith"). The user may select this option, for example, if the user recently met the desired individual named John Smith while John Smith was traveling, such as at a convention, at a business function, on a cruise, etc. Selection of the "travel information" option may result in the user being presented with additional options generated by the computing system 100 that include, for example, selectable trip date ranges, trip location information, hotel identification information, etc. For example, the user may be able to indicate to the computing system 100, in some embodiments, that the user is requesting to find the John Smith that was in Baltimore last week on a business trip and attended a specific business conference (at which conference, for example, the requesting user may have met John Smith). As will be discussed further below, in other embodiments, the computing system 100 may consider travel information associated with the requesting user and travel information associated with multiple potential matches (such as multiple individuals named John Smith) without the user specifically entering travel information in additional find criteria 226.

As a further example of additional find criteria 226 that may be entered by the user, the user may select to submit to computing device 100 information identifying one or more owned items or belongings owned by the desired individual. For example, if the user knows that the John Smith that the user is requesting to find owns a red Ford truck, the user may select the "Owned item information" option to be presented with additional options to enter information indicating a red Ford truck. Types of owned items that may be entered by the requesting user may include, for example, vehicles, electronics, clothes, art, or any other object that an individual may own, rent, or in which the individual may otherwise have an interest. If the requesting user enters owned item information as part of the user request to find a desired individual, the people find module 150 may retrieve information identifying items owned by a number of individuals from one or more data stores either internal or external to computing system 100, and consider this information when determining a person potentially matching the user request. As will be appreciated, in some embodiments, the computing device 100 may enable the user to enter additional find criteria beyond that displayed in user interface 220. For example, the user may be able to enter information regarding an age of the desired individual, a hometown, information regarding family members of the individual, etc.

Figure 2C:
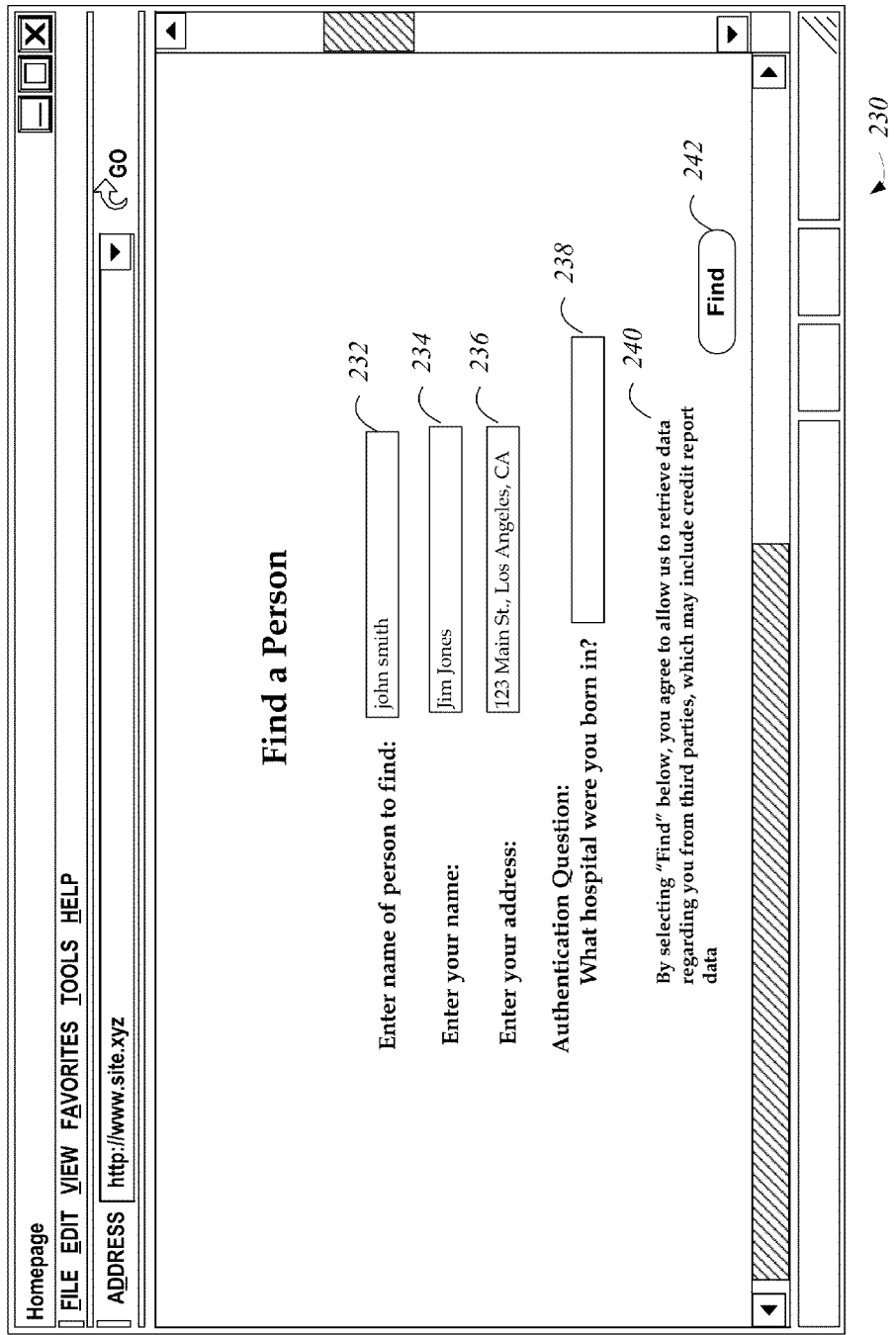

FIG. 2C is an illustrative user interface 230 generated by the computing system 100 that enables a user to enter a name of a person and request that the people find module 150 determine a matching person, where the request includes information identifying the requesting user and information that may be used by the people find module 150 to authenticate the requesting user's identity. The computing system 100 may authenticate or verify the requesting user's identity in certain embodiments in order to verify that the requesting user is who the requesting user claims to be. This authentication may be performed, in some embodiments, before the people find module 150 accesses validated information regarding the requesting user when determining an individual that matches the user's find request. For example, if the people find module 150 accesses information regarding the user from a credit report or other data from a credit bureau to compare the retrieved information with information associated with individuals potentially matching the find request, the people find module 150 may first verify that the user is actually the person that the user claims to be.

The illustrative user interface 230 includes field 232 in which the user may enter the name of the individual to find (in which the user has entered text "john smith"), field 324 in which the user may enter the user's own name (in which the user has entered "Jim Jones"), and field 236 in which the user may enter the user's own address (in which the user has entered "123 Main St., Los Angeles, Calif."). User interface additionally includes an authentication question, which the user may answer by entering text in field 238. The authentication question is indicated as "What hospital were you born in?" As will be appreciated, a variety of different authentication or identity verification questions may be presented to the user. According to some embodiments in which credit report data is used for authentication purposes, the potential authentication questions may generally be thought of as "out-of-wallet" questions, or questions that relate to personal information that is not easily accessible to individuals other than the person being authenticated, and which the individual is not likely to carry in his or her wallet or otherwise on his or her person. This manner of authentication will be understood to those of skill in the art of user identity verification and will not be described in detail herein. As indicated by text 240, the user is notified that by selecting find option 242, the user agrees to allow the computing system 100 to retrieve data regarding the user from one or more third party data sources, which may include credit report data, such as from a data store or computing system provided by a credit bureau.

Figure 2D:
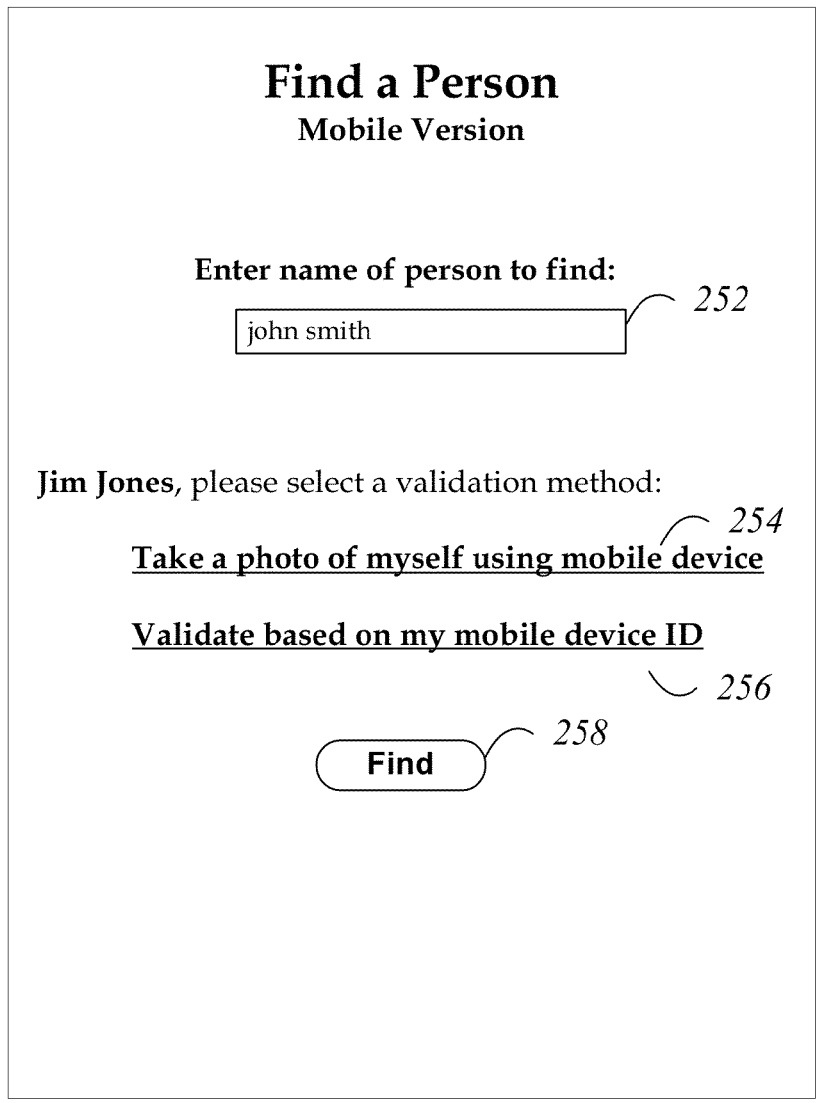
FIG. 2D is an illustrative user interface that may be presented for display on a mobile device that enables a user to enter a name of a person and request that the people find module described herein validate the requesting user and determine a matching person.

FIG. 2D is an illustrative user interface 250 generated by the computing system 100 that may be presented for display on a mobile device, such as client computing device 164 (which may be a mobile device in certain embodiments). The user interface 250 enables a user to enter a name of a person and request that the people find module 150 authenticate the requesting user and determine a matching person. As illustrated, the user interface 250 includes a field 252 in which the user has entered the name of the person to find, in a manner similar to that described above with reference to FIG. 2A. In addition, user interface 250 includes two validation method options 254 and 256. In certain embodiments, the user may be required to select one of validation options 254 and 256 prior to selecting find option 258.

If the user selects validation option 254, which reads "Take a photo of myself using mobile device," the user may be presented with a user interface generated in part by the computing system 100 and/or in part by the user's mobile device in order for the user to take a photograph of himself using a camera built in to the mobile device or otherwise in communication with the mobile device. The photo may then be sent from the mobile device to the computing system 100 and analyzed by the computing system 100 using known facial recognition technology in order to determine the identity of the user of the mobile device. For example, the user may have previously indicated that the user's name is Jim Jones, in which case the computing system may validate or authenticate that the user of the mobile device is in fact Jim Jones, as the user has indicated. If the user instead selects option 256, which reads "Validate based on my mobile device ID," the mobile device may send to the computing system 100 information identifying the device, such as a unique device identification number. The computing system 100 may then authenticate the user based on data retrieved from a data store that associates the individual with device identification information associated with one or more devices owned by the individual.

In other embodiments, including other embodiments in which a user may access a user interface similar to user interface 250 from a mobile device of the user, a user may not be prompted to provide any validation information. For example, the computing system 100 may already have access to personal information of the user as a result of previous validation information provided by the user. As another example, the computing system 100 may access personal information that the user previously self-reported, rather than accessing validated personal information regarding the user. In such embodiments, for example, the find module 150 may compare self-reported personal information regarding the user (such as social network profile information) with validated personal information regarding potential matching persons when responding to a person find request submitted by the user, as discussed further below.

Example Method

Depending on the embodiment, the method described with reference to the flowchart of FIG. 3 below, as well as any other methods discussed herein, may include fewer or additional blocks and/or the blocks may be performed in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the computing system 100, and/or other computing devices illustrated in the Figures, in order to perform the respective methods. For ease of explanation, the methods will be described herein as performed by the computing system 100 and/or people find module 150, which should be interpreted to include any one or more of the computing devices noted above and/or any other suitable computing device.

Figure 3:
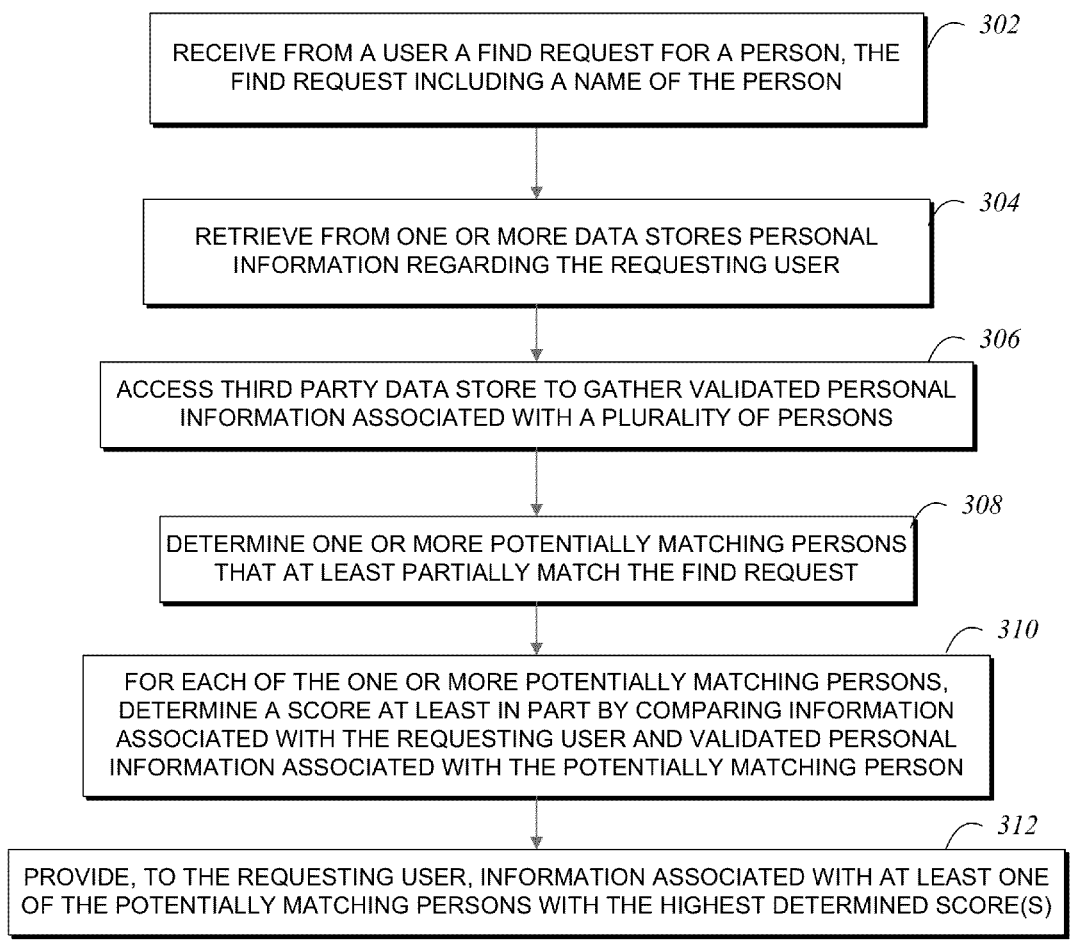
FIG. 3 is a flowchart illustrating one embodiment of a method for finding at least one matching person based on a find request received from a user.

FIG. 3 is a flowchart illustrating one embodiment of a method implemented by the people find module 150 for finding at least one matching person based on a find request received from a user. The illustrated method begins at block 302, where the people find module 150 receives from a user a find request for a person, where the find request includes at least a name of the person that the user is requesting to find. The find request may be received, for example, from client computing device 164 as a result of the user submitting a find request from a user interface generated by the computing system 100, such as one of the user interfaces discussed above with reference to FIGS. 2A-2D. Alternatively, in some embodiments, the find request may be received as an implied find request based on the user requesting a page with a Uniform Resource Identifier ("URI") that includes a name of an individual, such as "www.johnsmith.xyz," as will be discussed below with reference to FIG. 7. As discussed above with reference to FIGS. 2A-2D, the find request may include a variety of information associated with the requesting user and/or the individual that the user wishes to find. For example, the find request may include information regarding education background, work, travel, owned items, addresses, age, etc. However, in an advantageous embodiment, the find request module 150 has access to personal information of the user, as well as personal information of potential matching individuals, such that the user need only provide a name (or even a partial name) of an individual to be located.

At block 304, the people find module 150 retrieves from one or more data stores (or receives from one or more data sources such as a server or other computing system) personal information regarding the requesting user. The personal information regarding the requesting user may include personal data that has been self-reported by the user to one or more services (such as a social network service, online directory, etc.) or stored locally on the user's computing device, publicly accessible data found through one or more searches of known data sources, and/or may include validated data from a private data source, such as a credit bureau, financial institution, or other entity that maintains information regarding individuals. Example systems and methods for validating personal information are disclosed in related co-owned and co-pending U.S. patent application Ser. No. 13/204,579, entitled "Global Validation System," filed Aug. 5, 2011, which is incorporated herein by reference in its entirety. In embodiments in which validated information is retrieved regarding the user, the people find module 150 may first authenticate or validate the requesting user's identity before retrieving such information (not illustrated in FIG. 3, but discussed with reference to FIGS. 2C and 2D above). The retrieved personal information regarding the requesting user may include, but is not limited to, full name, current and previous addresses, schools attended, educational degrees received, current and previous employers, family members and other family information, travel information (such as a history of trips taken, including dates and locations), personal or business contacts, financial account information, other biographical or psychographic information, etc.

Next, at block 306, the people find module 150 accesses one or more third party data stores to retrieve information associated with a plurality of persons. The sources of data and types of data retrieved may be similar to those discussed above with respect to the retrieved information regarding the search requester, including publicly-accessible data and/or validated data. In some embodiments, the people find module 150 may initially retrieve name information for a number of individuals in order to first determine a subset of the individuals for which to retrieve additional personal information, including validated information. For example, the people find module 150 may initially search data that includes name information for a large number of people to determine individuals with a name that at least partially matches the requested name provided in the find request received from the user. In some embodiments, the initial search may consider common variations of names, such as names with slight spelling differences or common abbreviations, to nonetheless be potential matches (e.g., "Andy Smith" may be considered a potential name match for "Andrew Smith").

For individuals with names that at least partially match the name specified in the find request received from the user, the people find module 150 may then retrieve additional personal information, including validated personal data. The additional data retrieved may include, but is not limited to, current and previous addresses, schools attended, educational degrees received, current and previous employers, family members and other family information, travel information regarding trips taken by the individual, personal or business contacts, financial account information, belongings information regarding items owned by the individual, other biographical or psychographic information, etc. In other embodiments, rather than only retrieving this additional personal information for individuals with a name that at least partially matches the name provided in the find request, the people find module may retrieve or access at block 306 both name information and personal data for a large number of individuals and consider this information as discussed further below.

At block 308, once the people find module 150 has retrieved personal information associated with the requesting user and personal information associated with a plurality of persons, the people find module determines one or more potentially matching persons that at least partially match the find request. For example, in embodiments in which a subset of individuals was determined at block 306 that have a name at least partially matching the name provided in the find request, the people find module 150 may consider one or more of the additional types of personal data described above in combination with the initial name information when determining the one or more potentially matching persons at block 308. For example, if the user's find request included additional find criteria regarding a location, a belonging, an employer, travel information, etc., the people find module 150 may consider this information at block 308 in order to further narrow the initial subset of individuals with a potentially matching name to those that at least partially match the user's additional find criteria. The result of block 308 may be, for example, information identifying two or more individuals that at least partially match the find request, such as a number of individuals that all have the same or similar names as the name provided in the find request, and that at least partially match any additional find criteria provided by the user.

Next, at block 310, for each of the one or more potentially matching persons determined at blocks 306 and 308, the people find module 150 determines a score for the potentially matching person at least in part by comparing information associated with the requesting user and personal information (including validated personal information) associated with the given potentially matching person. For example, if the people find module 150 determined five individuals potentially matching the find request at block 308, at block 310 the people find module may determine five scores, one for each of the five individuals. Comparing the information may include, for example, determining one or more pieces of matching personal information that the requesting user and a given individual have in common. Matching personal information may include, for example, one or more determinations by the people find module 150 that the given potentially matching individual and the requesting user were both recently in the same city at the same time (based on trip information and/or residence information), both are associated with current or previous addresses near each other, both attended the same high school or university, both have worked or currently work for the same company, both are from the same hometown, both have similar interests or hobbies, etc. In addition, when determining the score for a given individual, the people find module may consider the extent to which the given individual matches any additional find criteria provided by the requesting user.

In some embodiments, the people find module may consider geolocation data associated with a user request, such as location data associated with an internet protocol address ("IP address"), to determine whether the potentially matching individual is associated with an address (current, previous, or future) near the geolocation data associated with the user's find request. In some embodiments, the people find module may consider links that the requesting user has to the potentially matching individual on one or more social networks. For example, the people find module may analyze first level links (the user's friends or direct connections), second level links (friends of friends), third level links, etc., such that the more closely linked a potentially matching individual is to the requesting user, the higher the link's effect on the potentially matching individual's score. In some embodiments, the geolocation and/or social network information may be non-public information. The people find module 150 may use such non-public information to determine the best matching person(s), but not provide the non-public information to the searcher.

In some embodiments, the people find module 150 may assign different weights to different pieces of matching data based on the type of personal information that the requesting user and the given individual being scored have in common. For example, the people find module may assign predetermined weights to each type of data, such that, for example, a match of a similar hobby is assigned a low weight, while a match of the same current employer is assigned a very high weight, indicating that an employer match is given substantially greater weight than a matching interest or hobby in determining a score.

In other embodiments, the weights may be assigned based on a rule set, such that a given type of matching information may be given different weights depending on other information associated with the requesting user and the given potentially matching individual. For example, a weight applied to a matching hobby may be greater if the hobby is relatively uncommon than if the hobby is common, and a weight applied to a matching hometown may be greater if the hometown is a small town than if the hometown is a large city. As another example, a weight applied to a determination that the requesting user and the given individual both have previous addresses in the same town may be greater if the individual and the requesting user lived at those addresses at the same time than if the individual and the requesting user lived in the same town at different times. In some embodiments, determinations of matching validated data may be assigned greater weight than matching data that is user-reported and/or unverified. For example, if the people find module determines that the requesting user and a given individual being scored both are associated with validated data that indicates that the requesting user and the given individual have the same employer (such as from credit bureau data), this match may be assigned greater weight than if the people find module determines this matching employer based exclusively on self-reported information in social networking profile information associated with the given individual. The scores determined by the people find module at block 310 may, in some embodiments, be normalized such that each score is in a given range, such as from 1-100. A graphical representation of the resulting scores according to certain embodiments is discussed below with reference to FIG. 4. Each score may be considered, according to some embodiments, a confidence rating regarding the likelihood that the given individual is the individual that the user requested to find.

At block 312, the people find module 150 provides, to the requesting user, information associated with at least one of the potentially matching persons with the highest determined score(s). In some embodiments, the people find module may only provide information to the requesting user regarding the individual with the highest determined score. In other embodiments, the people find module may provide information to the requesting user regarding multiple individuals, such as all individuals above a certain threshold score, up to a preset maximum number of individuals. In some embodiments, the people find module may provide information regarding the single highest scoring individual if the highest scoring individual has a score above a certain predetermined number (for example, a score of 90), but provide information regarding multiple individuals if none of the individuals have a score that meets the given predetermined minimum number. In other embodiments, instead of providing information regarding multiple individuals to the requesting user, the people find module may present the requesting user with one or more questions generated by the people find module regarding the individual that the requesting user is looking for in order to narrow the results and determine a single matching person. In some embodiments, the information provided to the requesting user may include basic identifying information associated with the potentially matching persons, such as that discussed below with reference to FIG. 5. In other embodiments, such as when the user request was received as a request for a URI that included an individual's name, the information provided to the user may be in the form of a personal page or user interface associated with the matching individual that is sent to the user's computing device for display, as discussed below with reference to FIG. 7.

Figure 4:
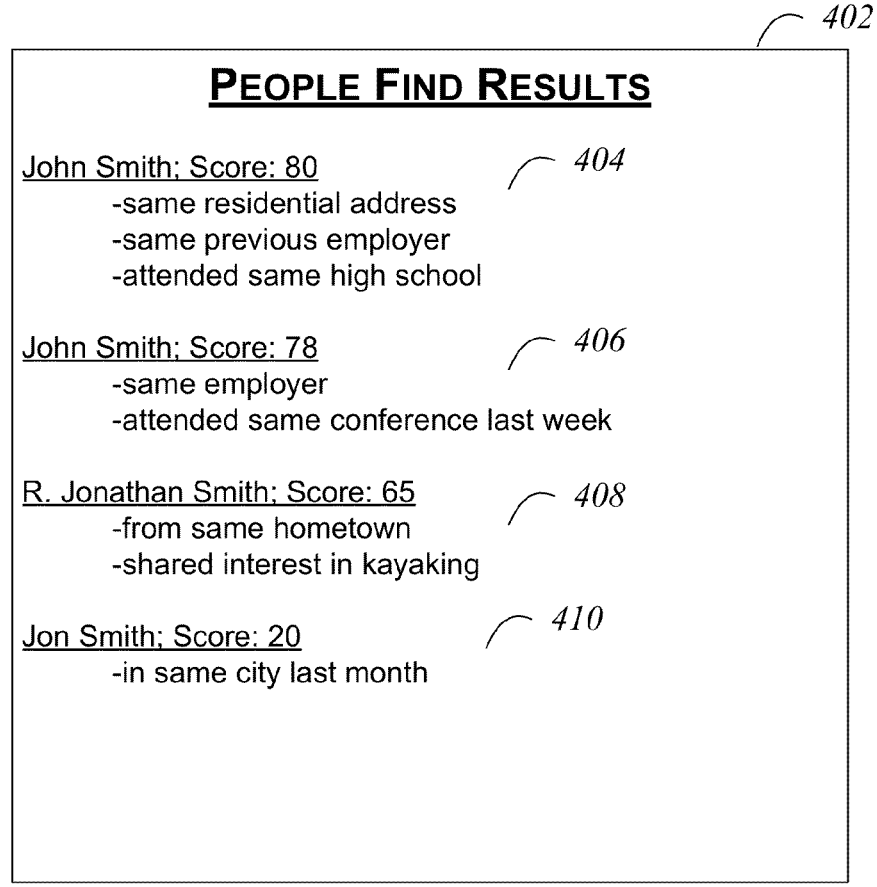
FIG. 4 is an illustrative representation of scores determined by the people find module in response to a find request received from a user.

FIG. 4 is an illustrative representation 402 of scores determined by the people find module 150 in response to a find request received from a user. The illustrated scores and accompanying information may not necessarily ever be displayed to a user, but are illustrated as a representation of underlying data and determinations made by the people find module when determining one or more individuals that potentially match a user's find request. As illustrated, four individuals 404, 406, 408 and 410 are identified, each individual being associated with a score and an indication of the one or more matching pieces of data that the people find module has determined that the given individual and the requested user have in common. According to the illustrated example, a user may have submitted a find request that indicated the user was requesting to find an individual named "John Smith." As indicated, the people find module has determined four potentially matching individuals, two individuals named "John Smith" (individuals 404 and 406), one individual 408 named "R. Jonathan Smith," and one individual 410 named "Jon Smith." As indicated, individual 404 has the highest determined score (a score of 80), which the people find module has determined based at least in part on determinations that individual 404 is associated with the same residential address of the requesting user, is associated with the same previous employer as the requesting user, and attended the same high school as the requesting user. The score of 80 determined for individual 404 may have been determined, as discussed above, based on applying different weights to the different pieces of matching information.

As indicated in representation 402, individual 406 has a score of 78, which was determined by the people find module based at least in part on a determination that the individual 406 and the requesting user have the same employer and attended the same conference last week, which may have been determined by analyzing travel data and/or calendar information associated with both the requesting user and individual 406. The score of 78 may generally indicate that the likelihood that individual 406 is the specific individual that the requesting user wanted to find is slightly lower than the likelihood that individual 404 is the specific individual that the requesting user wanted to find (because the score of 78 is slightly less than the score of 80). In contrast, the people find module 150 has indicated a substantially lower likelihood that individual 410 is the specific individual that the requesting user wanted to find (with a score of 20), based on a determination that the only matching personal information between the requesting user and individual 410 is that they were both in a certain city last month (for example, they both have previous travel itinerary that includes overlapping trips to Chicago).

Additional Example User Interfaces

Figure 5:
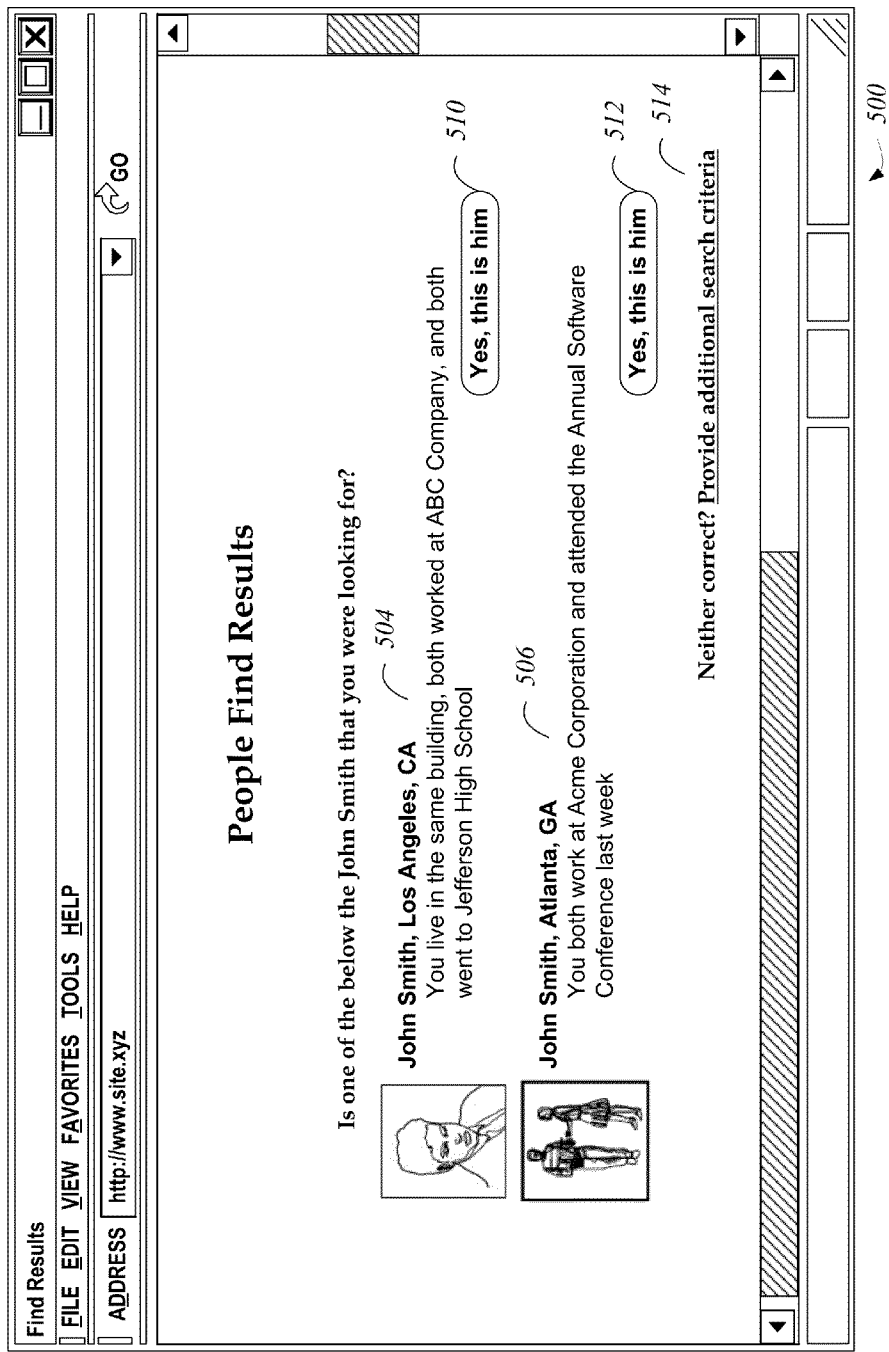
FIG. 5 is an illustrative user interface that displays information associated with potential matching persons in response to a find request received from a user.

FIG. 5 is an illustrative user interface 500 generated at least in part by the people find module 150 that displays information associated with potential matching persons in response to a find request received from a user. User interface 500 may be presented for display, for example, by client computing device 164 after the client computing device sent a person find request to the computing system 100 for an individual named "John Smith." The two individuals identified in user interface 500, individuals 504 and 506, may be the same individuals identified as individuals 404 and 406, respectively, with reference to FIG. 4 above. The people find module 150 may have determined to only display information associated with the individuals having the two highest scores for a variety of reasons depending on the embodiment. For example, the people find module may display information to the requesting user regarding individuals with scores above 70, or may simply display the two top scoring individuals regardless of the specific scores. As discussed above, in other embodiments, the people find module may display information regarding only a single highest scoring individual, or may display information regarding more than two individuals having the highest scores.

As illustrated, user interface 500 includes information identifying individual 504 as an individual named John Smith, living in Los Angeles, who has lived in the same building as the requesting user, previously worked at the same company as the requesting user, and went to the same high school as the requesting user. Individual 506 is identified as an individual named John Smith, living in Atlanta, who currently works at the same company as the requesting user, and attended the same conference as the requesting user last week. The requesting user may select option 510 in order to indicate to the people find module 150 that individual 504 is the specific John Smith that the requesting user was looking to find. Alternatively, the requesting user may select option 512 in order to indicate to the people find module 150 that individual 506 is the specific John Smith that the requesting user was looking to find. In one embodiment, the information that was matched by the people find module 150 between a potential matching person and the requesting user may not be displayed to the requesting user, which may be the case, for example, when non-public information was accessed by the people find module 150 regarding the potential matching person. For example, if the matching John Smith was determined based on an address in John Smith's credit file, the actual address may not be shared with the searcher as it may be considered confidential information that can only be shared with proper permissions from John Smith. However, that confidential address may be used by the people find module 150 to determine whether the John Smith is the particular John Smith being searched for.

The result of the user selecting either option 510 or option 512 may depend on the nature of the user's initial find request. For example, if the user's initial find request was related to a social network connection request, selection of option 510 may send a connection request to individual 504 indicating that the requesting user would like to connect with individual 504. Alternatively, selection of option 510 may provide the user with additional contact information or personal information regarding individual 504, or redirect a browser of the user's computing device to a page associated with individual 504, either provided by the computing device 100 or a third party server, such as third party device 166. If neither individual 504 nor individual 506 are the individual that the requesting user was looking to find, the user may select option 514 in order to be presented with additional user interface options with which to provide the people find module additional find criteria (discussed above).

Figure 6:
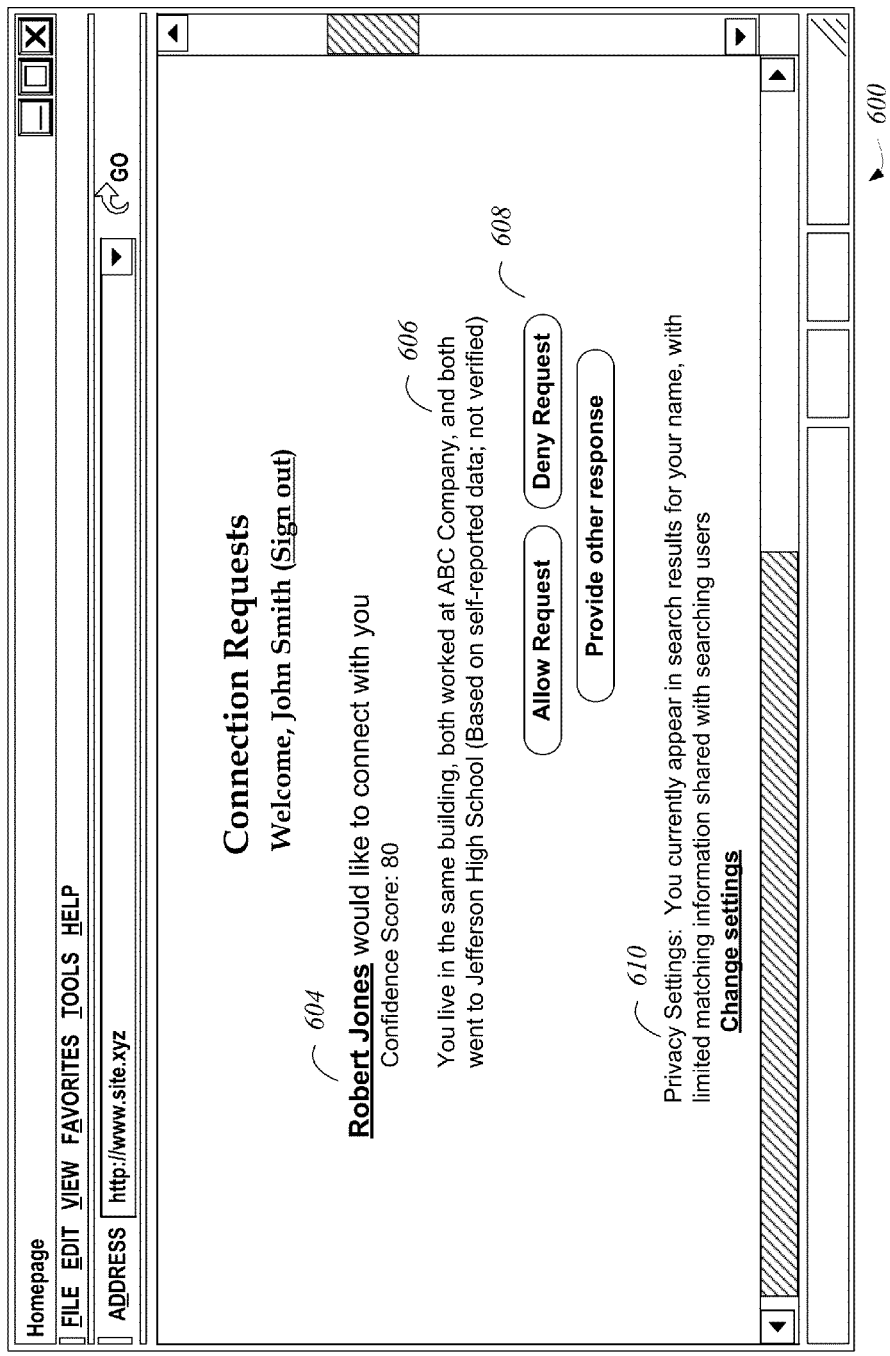
FIG. 6 is an illustrative user interface that displays connection request information to a user, along with information regarding how the user may know the requesting individual.

FIG. 6 is an illustrative user interface 600 generated at least in part by the people find module 150 that displays connection request information to a user, along with information regarding how the user may know the requesting individual. User interface 500 may be presented, for example, to an individual named John Smith, discussed above with reference to FIG. 5 as individual 504, with whom an individual 604 named Robert Jones has requested to connect. Robert Jones may be, for example, the requesting user discussed above with reference to FIG. 5, after the requesting user selected option 510 discussed above. User interface 600 may be presented to user John Smith, for example, when the user John Smith accesses from a user computing device similar to client system 164 a user account that he maintains with computing system 100 or with a third party system 166. Alternatively, information similar to the connection request illustrated in user interface 600 may be sent to user John Smith as an electronic message, a Short Message Service ("SMS") message to a mobile device associated with the user, etc.

As illustrated, user interface 600 includes matching information 606 that indicated to the user John Smith at least some of the pieces of personal information that the user Robert Jones and user John Smith have in common (as previously determined by the people find module 150, as discussed above). The matching information 606 includes an indication of which information was self-reported and which information is verified or validated information. The displayed information includes indication of a confidence score of 80, indicating to the user John Smith the relative confidence that the people find module has in the determination that Robert Jones and John Smith know each other or otherwise have some real-world connection to each other. The user may select from options 608 to indicate whether the user would like to allow or deny the connection request received from Robert Jones.

The user may select privacy setting option 610 in order to change the user's privacy settings associated with the computing system 100. As indicated, the user current settings are such that the user will appear in search results for his name (e.g., information at least partially identifying him may potentially appear in response a person find request for his name or similar names), but only limited matching information will be displayed to a requesting user. Other privacy options provided by the computing system 100 may include, for example, removing user John Smith from any consideration as a match in response to a person find request, or requiring that the computing system 100 first receive user John Smith's approval each time he is determined to be a potential match before any information identifying him is provided to a requesting user.

Figure 7:
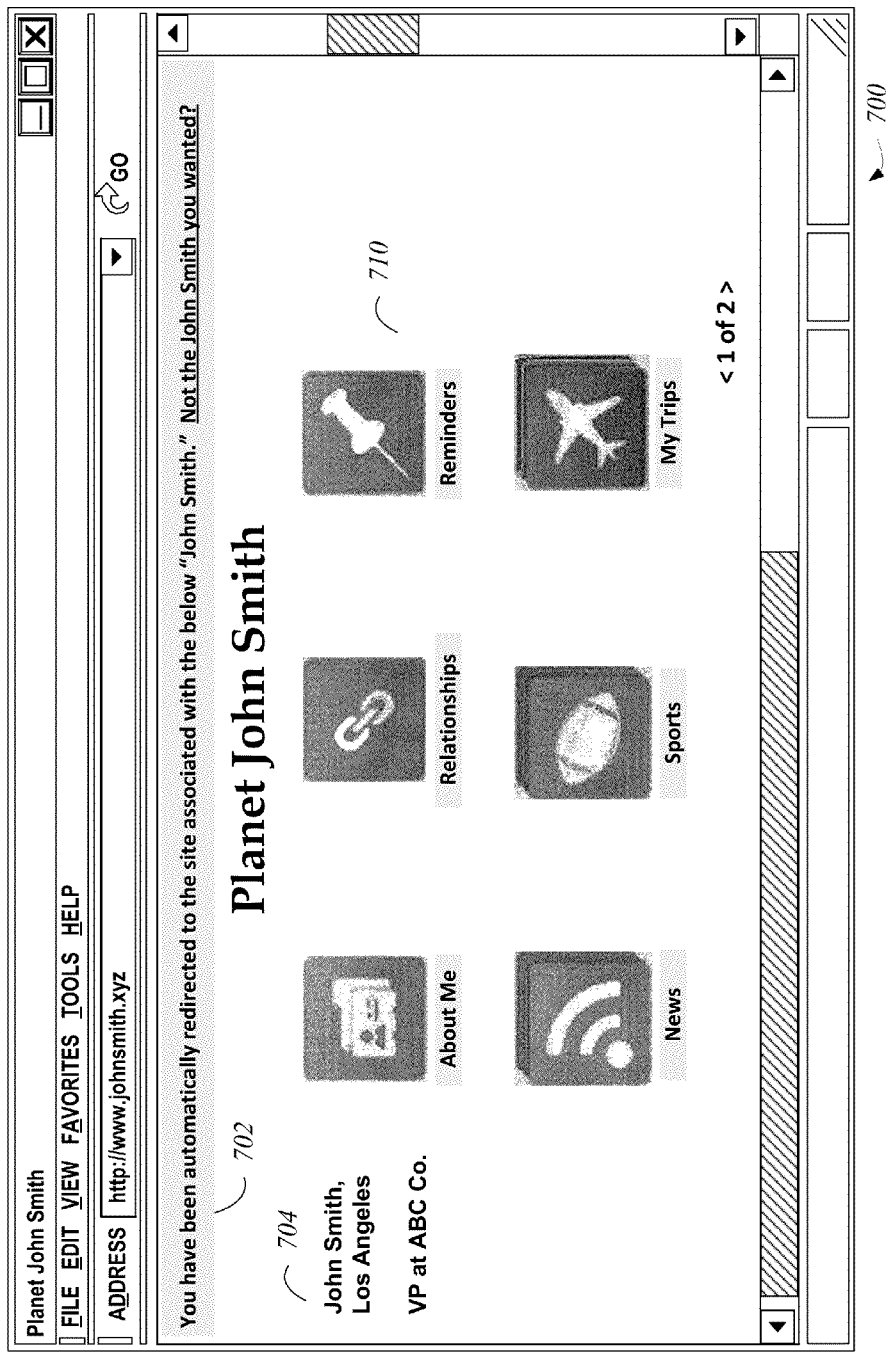
FIG. 7 is an illustrative user interface that may be displayed on a computing device that has had a browser operating on the computing device automatically redirected to an individual's personal page based on potential match determinations made by the people find module.

FIG. 7 is an illustrative user interface 700 that may be displayed on a user computing device, such as client device 164, that has had a browser operating on the computing device automatically redirected to an individual's personal page based on potential match determinations made by the people find module 150. For example, the computing system 100 or third party server 166 may maintain a personalized URI that corresponds to multiple individuals that share a common name, and may determine the appropriate individual corresponding to any individual page request for that URI based on performing a person find request as discussed above. As illustrated, a user has requested a URI that includes a name, specifically a URI that includes "johnsmith." There may be, for example, eight different individuals named John Smith that have created separate pages that may each be accessed by requesting this same URI. As indicated by text 702, the browser of the requesting user has been automatically redirected to the page associated with a certain John Smith 704. The certain John Smith 704 may have been determined by the people find module based on a comparison of personal information shared between the requesting user and the given John Smith 704, according to the methods discussed above. The given John Smith 704 may have, for example, had a determined score relative to the requesting user above a certain threshold, such that the people find module automatically redirected the requesting user's browser rather than prompting the user to select the John Smith whose page the requesting user intended to access. The page content 710 for the given John Smith 704 may generally include information associated with the given John Smith 704, including information authored or self-reported by John Smith 704, and/or information gathered by the computing system 100 regarding John Smith 704 from one or more data sources.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

All publications and patent applications mentioned in this specification are herein incorporated by reference in their entirety to the same extent as if each individual publication or patent application was specifically and individually indicated to be incorporated by reference.

What is claimed is:

1. A system for determining a person that matches a user request, the system comprising:
    a computing device that is operative to:
        receive from a user computing device a request of a requesting user that includes identification information at least partially identifying a person other than the requesting user, the request including a name of the person;
        retrieve from a data store personal information regarding the requesting user;
        retrieve from at least one validated data source validated personal information regarding two or more individuals potentially matching the request;
        for each of the two or more individuals potentially matching the request, determine match scores for the respective individuals, wherein the match scores are determined at least in part by comparing the personal information regarding the requesting user and the validated personal information regarding the respective individuals;
        determine at least one matching individual from the two or more individuals potentially matching the request, wherein the at least one matching individual is determined based on the at least one matching individual having a highest determined match score among the two or more individuals potentially matching the request; and
        send to the user computing device information associated with the at least one matching individual.

2. The system of claim 1, wherein the validated information includes credit report data.

3. The system of claim 1, wherein the validated data source comprises a data source provided by a credit bureau.

4. The system of claim 1, wherein the validated personal information regarding the two or more individuals potentially matching the request comprises information that is not accessible to the requesting user.

5. The system of claim 1, wherein the personal information regarding the requesting user and the validated personal information regarding the two or more individuals potentially matching the request comprises at least one of employer information, past residence information, and current residence information.

6. The system of claim 1, wherein determining the match score for each of the two or more individuals potentially matching the request comprises comparing travel information associated with the requesting user and travel information associated with the two or more individuals potentially matching the request.

7. The system of claim 1, wherein sending to the user computing device information associated with the at least one matching individual comprises sending to the user computing device a personal page associated with one of the at least one matching individuals.

8. The system of claim 1, wherein the computing device is further operative to:
    retrieve validated personal information regarding the requesting user;
    wherein determining match scores for the individuals potentially matching the request comprises comparing the validated personal information regarding the requesting user with the validated personal information regarding the respective individuals.

9. A computer-implemented method for determining a person matching a user request, the computer-implemented method comprising:
    as implemented by one or more computing devices configured with specific executable instructions,
        receiving from a user computing device a request of a requesting user that includes identification information at least partially identifying a person other than the requesting user, the request including a name of the person;
        retrieving from a data store personal information regarding the requesting user;
        retrieving from a validated data source validated personal information regarding two or more individuals potentially matching the request;
        for each of the two or more individuals potentially matching the request, determining match scores for the respective individuals, wherein the match scores are determined at least in part by comparing the personal information regarding the requesting user and the validated personal information regarding the respective individuals;
        determining at least one matching individual from the two or more individuals potentially matching the request, wherein the at least one matching individual is determined based on the at least one matching individual having a highest determined match score among the two or more individuals potentially matching the request; and
        sending to the user computing device information associated with the at least one matching individual.

10. The computer-implemented method of claim 9, wherein the validated personal information is provided by a credit bureau.

11. The computer-implemented method of claim 9, wherein the request of the requesting user includes information identifying a belonging, wherein the computer-implemented method further comprises:

retrieving information identifying one or more belongings owned by the two or more individuals potentially matching the request;

wherein the match scores for the respective individuals potentially matching the request are determined based at least in part on a determination of whether the respective individuals own the belonging identified in the request of the requesting user.

12. The computer-implemented method of claim 9, wherein determining the match scores for the respective individuals potentially matching the request comprise applying different weights to different types of personal information that is shared between the requesting user and the respective individuals potentially matching the request.

13. The computer-implemented method of claim 9, further comprising authenticating identity of the requesting user based at least in part on answers received from the requesting user in response to questions regarding validated personal information regarding the requesting user.

14. The computer-implemented method of claim 9, further comprising authenticating identity of the requesting user based at least in part on at least one of device identifier received from the user computing device and a photograph of the requesting user received from the user computing device.

15. The computer-implemented method of claim 9, further comprising sending to the user computing device information identifying one or more pieces of personal information that the requesting user and the at least one matching individual have in common.

16. The computer-implemented method of claim 9, further comprising providing information to the at least one matching individual regarding the request of the requesting user, wherein the provided information includes information identifying one or more pieces of personal information that the requesting user and the at least one matching individual have in common.

17. A computer-readable medium encoded with software modules including instructions that are readable by a computing device, wherein the software modules include:

a first module configured to receive from a user computing device a request of a requesting user that includes identification information at least partially identifying a person other than the requesting user, the request including a name of the person;

a second module configured to retrieve from a data store personal information regarding the requesting user;

a third module configured to retrieve from a validated data source validated personal information regarding two or more individuals potentially matching the request;

a fourth module configured to, for each of the two or more individuals potentially matching the request, determine match scores for the respective individuals, wherein the match scores are determined at least in part by comparing the personal information regarding the requesting user and the validated personal information regarding the respective individuals; and a fifth module configured to determine a matching individual from the two or more individuals potentially matching the request, wherein the matching individual is determined based on the matching individual having a highest determined match score among the two or more individuals potentially matching the request.

18. The computer-readable medium of claim 17, further comprising:

a sixth module configured to transmit information identifying the matching individual to a third party server, such that the third party server may send a page associated with the matching individual to the user computing device.

* * * * *